United States Patent
Wakita et al.

(10) Patent No.: US 7,252,721 B2
(45) Date of Patent: Aug. 7, 2007

(54) POWER TRANSMISSION SHAFT

(75) Inventors: Kazuya Wakita, Shizuoka-ken (JP);
Katsuyuki Ikei, Shizuoka-ken (JP);
Hisaaki Kura, Shizuoka-ken (JP)

(73) Assignee: NTN Corporation, Osaka (JP)

( * ) Notice: Subject to any disclaimer, the term of this patent is extended or adjusted under 35 U.S.C. 154(b) by 337 days.

(21) Appl. No.: 10/153,865

(22) Filed: May 24, 2002

(65) Prior Publication Data
US 2002/0182438 A1 Dec. 5, 2002

(30) Foreign Application Priority Data
May 28, 2001 (JP) ............... 2001-158691
May 28, 2001 (JP) ............... 2001-158766

(51) Int. Cl.
*C22C 38/04* (2006.01)
(52) U.S. Cl. ............... 148/320; 148/909; 420/120
(58) Field of Classification Search ............... 148/320, 148/520, 590, 593, 570, 909
See application file for complete search history.

(56) References Cited

U.S. PATENT DOCUMENTS

| 4,566,810 A | | 1/1986 | Yoshioka et al. | |
| 5,449,420 A | * | 9/1995 | Okada et al. | 148/333 |
| 5,857,916 A | | 1/1999 | Schoch et al. | |
| 5,961,748 A | * | 10/1999 | Ono et al. | 148/333 |
| 6,065,813 A | | 5/2000 | Fett et al. | |

FOREIGN PATENT DOCUMENTS

| JP | 59-038357 | 3/1984 |
| JP | 59038357 | 3/1984 |
| JP | 60100628 | 6/1985 |
| JP | 61-160621 | 7/1986 |
| JP | 63-100126 | 5/1988 |
| JP | 04-116123 | 4/1992 |
| JP | 07-090379 | 4/1995 |

(Continued)

OTHER PUBLICATIONS

European Search Report, Sep. 3, 2002.

(Continued)

*Primary Examiner*—George P. Wyszomierski
(74) *Attorney, Agent, or Firm*—Arent Fox LLP

(57) ABSTRACT

A power transmission shaft having an improved strength and ensuring a stable torsion fatigue strength. The power transmission shaft has coupling members respectively provided on the opposite ends of an pipe part made of a steel material. The steel material includes 0.30-0.45% by weight of C, 0.05-0.35% by weight of Si, 1.0-2.0% by weight of Mn, 0.05% by weight or less of Al, 0.01% by weight or less of S, and the remainder (iron Fe and unavoidable impurities). The pipe part has an electro-unite portion that extends in the axial direction. The electro-unite portion and neighborhood thereof are hardened so as to have a Rockwell hardness HRC of 45 or more. Also, another power transmission shaft has coupling members integrally formed on opposite ends thereof. In addition, the shaft is formed from a steel element tube by a plastic working. The shaft has an inner diametrical surface which is subjected to a high-frequency induction hardening and tempering treatment to make the surface portion hardness of the inner diametrical surface to have a Rockwell hardness HRC of 35 or more.

1 Claim, 6 Drawing Sheets

| T.P. No. | Chemical elements in the material (%) | | | | | | | Hardness at the electro-unite portion and neighborhood thereof (HRC) | Repeated time before breakage (Times) | Judgment |
|---|---|---|---|---|---|---|---|---|---|---|
| | C | Si | Mn | S | Al | Cr | B | | | |
| 1 | 0.31 | 0.23 | 0.85 | 0.005 | 0.030 | – | – | 31.0 | 18300 | × |
| 2 | 0.37 | 0.17 | 0.67 | 0.005 | 0.020 | – | 0.0013 | 36.5 | 239000 | × |
| 3 | 0.37 | 0.17 | 0.67 | 0.005 | 0.020 | – | 0.0013 | 43.0 | 240000 | × |
| 4 | 0.31 | 0.24 | 1.30 | 0.006 | 0.035 | – | 0.0020 | 48.0 | 583000 | ○ |
| 5 | 0.31 | 0.24 | 1.30 | 0.006 | 0.035 | – | 0.0020 | 47.9 | 619000 | ○ |
| 6 | 0.31 | 0.24 | 1.49 | 0.003 | 0.033 | – | – | 49.2 | 905000 | ○ |
| 7 | 0.35 | 0.23 | 1.30 | 0.005 | 0.035 | 0.14 | 0.0025 | 50.2 | 776000 | ○ |
| 8 | 0.35 | 0.23 | 1.30 | 0.005 | 0.035 | 0.14 | 0.0025 | 48.9 | 757000 | ○ |

FOREIGN PATENT DOCUMENTS

| | | |
|---|---|---|
| JP | 08-295934 | 11/1996 |
| JP | 10-036937 | 2/1998 |
| JP | 11-080899 | 3/1999 |
| JP | 2000-002229 | 1/2000 |
| JP | 2000234141 | 8/2000 |

OTHER PUBLICATIONS

English Abstract of DE 4423832 dated Apr. 20, 1995.
English Abstract of Japanese Patent Publication No. 55175320 filed Dec. 12, 1980.
English language translation of claims 1-5 of DE 2855487A1.

* cited by examiner

FIG. 4

| T.P. No. | Chemical elements in the material (%) | | | | | | | Hardness at the electro-unite portion and neighborhood thereof (HRC) | Repeated time before breakage (Times) | Judgment |
|---|---|---|---|---|---|---|---|---|---|---|
| | C | Si | Mn | S | Al | Cr | B | | | |
| 1 | 0.31 | 0.23 | 0.85 | 0.005 | 0.030 | — | — | 31.0 | 18300 | × |
| 2 | 0.37 | 0.17 | 0.67 | 0.005 | 0.020 | — | 0.0013 | 36.5 | 239000 | × |
| 3 | 0.37 | 0.17 | 0.67 | 0.005 | 0.020 | — | 0.0013 | 43.0 | 240000 | × |
| 4 | 0.31 | 0.24 | 1.30 | 0.006 | 0.035 | — | 0.0020 | 48.0 | 583000 | ○ |
| 5 | 0.31 | 0.24 | 1.30 | 0.006 | 0.035 | — | 0.0020 | 47.9 | 619000 | ○ |
| 6 | 0.31 | 0.24 | 1.49 | 0.003 | 0.033 | — | — | 49.2 | 905000 | ○ |
| 7 | 0.35 | 0.23 | 1.30 | 0.005 | 0.035 | 0.14 | 0.0025 | 50.2 | 776000 | ○ |
| 8 | 0.35 | 0.23 | 1.30 | 0.005 | 0.035 | 0.14 | 0.0025 | 48.9 | 757000 | ○ |

FIG. 5

| Surface portion hardness of the inner diametrical surface (HRC) | Load torque ±1.0kN·m | | | Load torque ±1.2kN·m | | |
|---|---|---|---|---|---|---|
| | Repeated time before breakage (Times) | Breakage origin | Judgment | Repeated time before breakage (Times) | Breakage origin | Judgment |
| 53.5 | 1000000 or more | — | ○ | 340000 | Out | ○ |
| 51.0 | 937000 | Out | ○ | 312000 | Out | ○ |
| 47.5 | 757000 | Out | ○ | 277000 | Out | ○ |
| 47.0 | 882000 | Out | ○ | 264000 | Out | ○ |
| 44.0 | 776000 | Out | ○ | 244000 | Out | ○ |
| 37.0 | 686000 | Out | ○ | 239000 | Out | ○ |
| 30.0 | 295000 | In | × | 59900 | In | × |
| 29.2 | 64500 | In | × | 18000 | In | × |
| 27.7 | 28500 | In | × | 6300 | In | × |

FIG. 6

| Perform shot peening or not | Residual compression stress of the outer diametrical surface (MPa) | Repeated time before breakage (Times) |
|---|---|---|
| No | 280 | 110000 |
| No | | 106000 |
| No | | 120000 |
| No | | 108000 |
| Yes | 1170 | 990000 |
| Yes | | 1160000 |
| Yes | | 884000 |

POWER TRANSMISSION SHAFT

BACKGROUND OF THE INVENTION

1. Field of the Invention

The present invention relates to a power transmission shaft to be used as, for example, a drive shaft or a propeller shaft, which constitutes a part of a power transmission system in an automobile.

2. Description of the Related Art

In general, there are several kinds of transmission shafts that constitute a power transmission system of an automobile. The shafts include a drive shaft for connecting between an engine and a wheel-bearing device, a propeller shaft for transmitting power from a transmission to reduction gears, and so on. Each of these shafts has a coupling member such as a spline on the shaft-end. The power transmission shafts may be broadly classified in the group of solid shafts made of solid bars and the other group of hollow shafts made of steel pipes or the like, according to their basic structures.

Conventionally, solid shafts have been used as power transmission shafts for automobiles. In recent years, for responding to the needs for higher function of automobiles, the sound insulating properties of a cabin to keep quiet, and the like, there are increasing demands of providing a power transmission shaft with various kinds of characteristic features, such as light weight, compactness, and comfortability against NVH (noise, vibration, and harshness), in addition to strength and durability. In addition, there is also required to improve the torsional rigidity of shafts for increasing the controllability and direct feeling of automobile at the time of start. In this case, for improving the torsional rigidity, there is an idea of increasing the diameter of the shaft. However, it will effect an increase in costs because of increasing the weight and the cutting amount of a coupling portion. In addition to the above demands, there is a need for adjusting the natural frequency of automobile for avoiding the noise produced by a resonance between vibrations of an engine and a shaft while the automobile runs. For adjusting the natural frequency, there is an idea of attaching a dumper or the like on the power transmission shaft. However, it will lead to an increase in costs because of increasing the number of structural components and the number of assembling steps in the manufacturing process.

As a consequence of considering the above demands in terms of functions, there is an increasing tendency to make greater use of hollow shafts instead of the solid shafts. The hollow shafts can be broadly divided into integral-type and joined-type. The integral-type hollow shaft comprises a middle pipe part having the largest outer diameter and shaft parts integrally formed on the opposite ends of the pipe part. The shafts parts are made of the same material as that of the middle pipe part and a coupling portion such as a spline is formed on the outer periphery of each shaft-end. On the other hand, the joined-type hollow shaft comprises a pipe part and shaft parts. These parts are shaped separately and are then joined together using friction pressure welding, electric welding, or the like.

Comparing with the solid shaft, the integral-type or joined-type hollow shaft has a reduced section modulus, while the maximum shear-stress thereof operative to the hollow shaft is large. Therefore, there is a possibility of a decrease in the shear strength of the hollow shaft.

In some cases, an electro-resistance-welded tube having a wall thickness with an extremely high accuracy and an extremely stable strength is used as a power transmission hollow shaft. The welded tube is comprised of two or more pipe parts. The pipe parts are made of a steel material having a good dimensional accuracy and a good finishing accuracy and are butt-joined in a straight line using electric resistance welding. Therefore, the welded portion of an electro-unite part of the welded pipe, which extends in the axial direction, tends to be broken, leading to a decrease in the strength of the power transmission shaft.

In addition, the integral-type hollow shaft for power transmission is typically formed by, for example, a swaging in which the diameter of an element tube is reduced by stamping in the radial direction thereof at high speed, while rotating the tube around the axis; or a press working in which the diameter of an element tube is reduced by inserting the element tube into a die. The hollow shaft formed by such a plastic working of the swaging or the like may have a plastic flow of the raw material into the inner radial at the time of reducing the diameter of the element tube. Thus, there is a tendency in which the inner radial surface of the hollow shaft become wrinkled. Such a wrinkle may become the origin of breakage, causing a decrease in the strength of the power transmission shaft.

SUMMARY OF THE INVENTION

An object of the present invention is to provide a power transmission shaft allowing an improvement in the strength and allowing a stable torsion fatigue strength.

As technical means for attaining the above object, a first aspect of the present invention is to provide a power transmission shaft comprising coupling members respectively provided on opposite ends of a pipe part made of a steel material, wherein the steel material includes 0.30-0.45% by weight of carbon (C), 0.05-0.35% by weight of silicon (Si), 1.0-2.0% by weight of manganese (Mn), 0.05% by weight or less of aluminum (Al), 0.01% by weight or less of sulfur (S), and the remainder, iron (Fe) and unavoidable impurities, and the pipe part has an electro-unite portion that extends in an axial direction, the electro-unite portion and neighborhood thereof being hardened by a hardening treatment so as to have a Rockwell hardness HRC of 45 or more. Here, the hardening treatment may be preferably a high-frequency induction hardening and tempering treatment. Here, the term "neighborhood of the electro-unite portion" means that a portion within 5 mm far from the middle to the opposite ends in the circumferential direction of the electro-unite portion.

In this embodiment, a steel material in which the amount of each of the above components (C, Si, Mn, Al, and S) is defined in the above range is used and its electro-unite portion and neighborhood thereof are hardened so that the Rockwell hardness HRC thereof can be 45 or over. Therefore, the hardness of the pipe to be required as a power transmission shaft can be satisfied. Such a hardness makes sure of a stable torsion fatigue strength, providing a power transmission shaft of an elongated useful life and a high reliability. In addition, an electric-resistance welded tube is used as a steel pipe to be used as the subject pipe for stably ensuring the shaft strength. Thus, the power transmission shaft can be hardly broken at an electro-unite portion thereof, preventing a decrease in the strength of the pipe.

A second aspect of the present invention is to provide a power transmission shaft with coupling members integrally formed on opposite ends thereof, which is formed from a steel element tube by a plastic working, comprising an inner diametrical surface which is subjected to a hardening treatment. Preferably, the hardening treatment may be a high-frequency induction hardening and tempering treatment.

The hardening treatment on the inner diametrical surface can be performed by arranging a coil for high-frequency induction heating on the inner diametrical side of the power transmission shaft. Alternatively, the hardening treatment from the outer diametrical surface can be performed by arranging such a coil for high-frequency induction heating on the outer diametrical side of the power transmission shaft. In the hardening treatment with high-frequency induction hardening and tempering, the surface-portion hardness of the inner diametrical surface is a Rockwell hardness HRC of 35 or more. Here, the term "surface portion" means that, for example, about one fourth of the wall thickness of the power transmission shaft.

According to the present invention, as described above, the inner diametrical surface is subjected to the hardening treatment, so that it becomes possible to ensure a hardness to be required for the power transmission shaft. In addition, such a resulting hardness allows to prevent the generation of wrinkle on the inner diametrical surface by a plastic working to be effected as an origin of breakage. As a result, the power transmission shaft that ensures a stable torsion fatigue strength and having a high reliability and a long useful life can be obtained.

Furthermore, by applying a predetermined residual compression stress on the outer diametrical surface of the power transmission shaft, the residual compression stress increases. As a result, it becomes possible to further increase the torsion fatigue strength. Such a residual compression stress can be easily applied by a shot peening treatment. In addition, the residual compression stress may be preferably 750 MPa or more.

BRIEF DESCRIPTION OF THE DRAWINGS

In the accompanying drawings:

FIG. 4 is a table of the results of an examination of torsion fatigue strength;

FIG. 5 is a table of the results of an examination of torsion fatigue strength; and FIG. 6 is a table of the results of an examination of torsion fatigue strength in the presence or absence of shot peening.

DETAILED DESCRIPTION OF THE PREFERRED EMBODIMENTS

Figure 1:
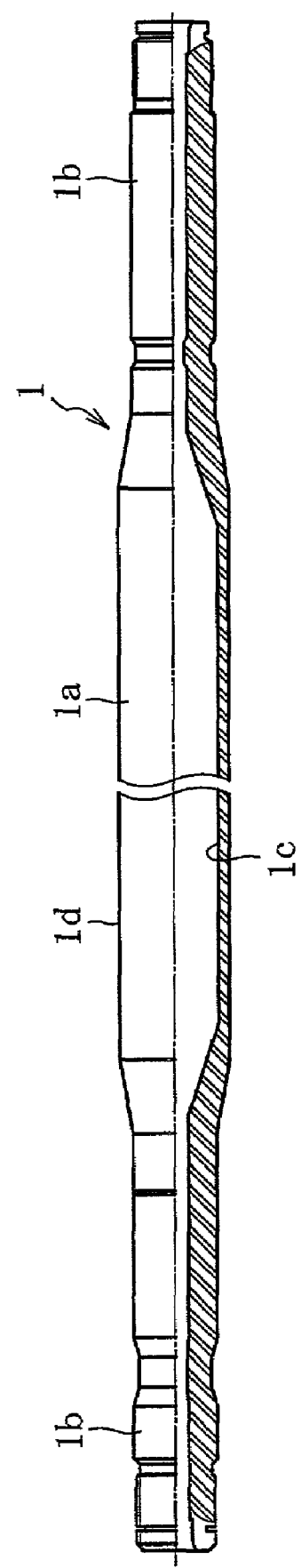
FIG. 1 is a partially cross-sectional front view of a power transmission shaft as one of preferred embodiments of the present invention, which is provided as an integral-type hollow shaft.

FIG. 1 shows a power transmission shaft as one of preferred embodiments of the present invention. The power transmission shaft 1 is provided as an integral-type hollow shaft. That is, the power transmission shaft 1 comprises: a middle pipe part 1a having a largest diameter portion, compared with the others; and axial parts 1b provided on the opposite ends of the middle pipe part 1a in which a coupling portion such as a spline is formed on the outer periphery of each end portion of the axial parts 1b. These parts 1a, 1b are integrally shaped from the same element tube.

Figure 2:
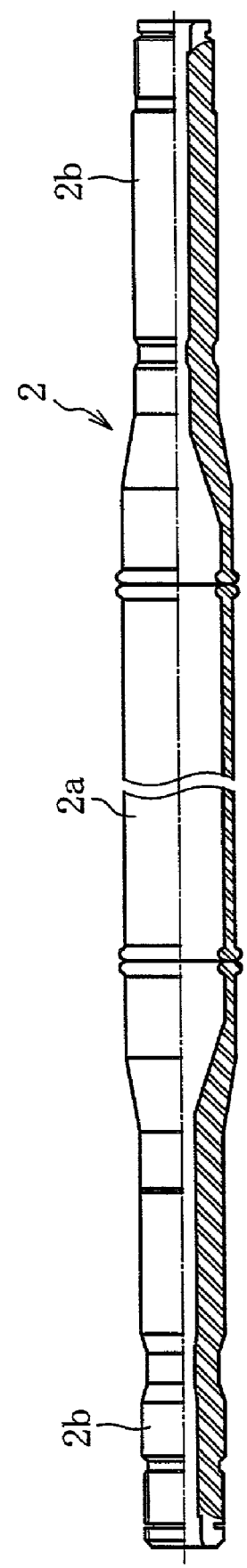
FIG. 2 is a partially cross-sectional front view of a power transmission shaft as another preferred embodiment of the present invention, which is provide as a joined-type hollow shaft.
Figure 3:
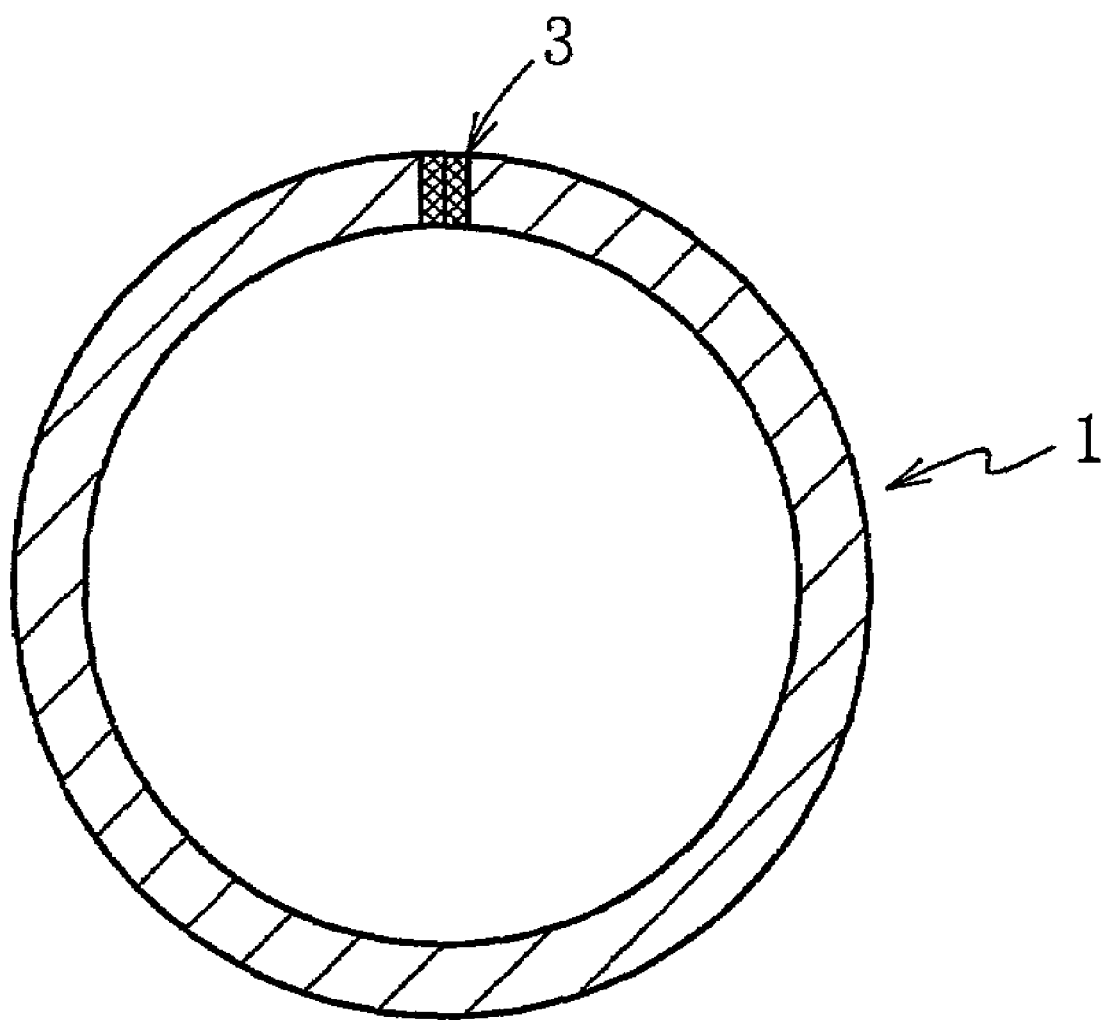
FIG. 3 is a radial cross-sectional view of an electro-unite portion of a pipe (i.e., an electric-resistance welded tube)

Referring now to FIG. 2, there is shown a power transmission shaft as an alternative preferred embodiment of the present invention. In this embodiment, the power transmission shaft 2 may be provided as a joined-type hollow shaft. That is, this shaft is fabricated by joining a pipe part 2a and axial parts 2b by welding such as friction pressure welding, or the like. In this case, it is noted that these parts 2a, 2b are separately formed. FIG. 3 is a cross sectional view for illustrating the pipe part 1a of the power transmission shaft 1 shown in FIG. 1 or the pipe part 2a of the power transmission shaft 2 shown in FIG. 2. For simplified description because of commonly observed structural features in FIG. 1 and FIG. 2, we will describe the structure shown in FIG. 3 in accordance with the embodiment shown in FIG. 1.

In this case, the power transmission shaft 1 is prepared from an electric-resistance welded tube having a wall thickness with an excellent accuracy. In this electric-resistance welded tube, each of pipes is prepared by shaping a plate having an excellent dimensional accuracy and finishing accuracy into a pipe, and the thus-obtained pipes are butt-joined in a straight line using electric resistance welding. Thus, the power transmission shaft 1 has an electro-unite portion 3 as welded portions formed in the axial direction (see FIG. 3).

The power transmission shaft 1 is made of a steel material, which includes 0.30-0.45% by weight of carbon (C), 0.05-0.35% by weight of silicon (Si), 1.0-2.0% by weight of manganese (Mn), 0.05% by weight or less of aluminum (Al), 0.01% by weight or less of sulfur (S), and the remainder, iron (Fe) and unavoidable impurities, and the electro-unite portion 3 and neighborhood thereof are hardened so as to have a Rockwell hardness HRC of 45 or more.

Such a hardening treatment can be realized by performing a high-frequency induction hardening and tempering treatment on the power transmission shaft 1. Hatching portions shown in FIGS. 1 and 2 are regions subjected to the high-frequency induction hardening and tempering, indicating a bake-out state. The power transmission shaft 1 is fabricated using a steel material comprising the above components, so that the hardening treatment can be allowed to provide the electro-unite portion 3 and neighborhood thereof with a Rockwell hardness HRC of 45 or more. Consequently, the strength of the pipe itself increases, while making sure of a stable torsion fatigue strength.

Here, in general, it is known in the art that a torsion fatigue strength of the power transmission shaft 1 is substantially depended on the hardness, and also the hardness is depended on the composition of the steel material. That is, there is the need to adjust the amount of each component because an element that defines the hardness after quench hardening is carbon (C), while other elements (e.g., Si and Mn) may be effective to define the hardness after quench hardening in the depth direction.

Carbon (C) is an essential element for obtaining a desired torsion fatigue strength of the power transmission shaft 1. For obtaining the predetermined hardness after the application of heat, the amount of carbon (C) should be 0.3% by weight or more. Further, if it is more than 0.45% by weight, the hardness of the steel material becomes excess. Therefore, the machinability of the steel material becomes decreased. Thus, the upper limit for the amount of carbon to be contained is 0.45% by weight. A small amount silica (Si) is required as a deoxidizer for the steel material in addition to be required to ensure the effect of induction hardening on the steel material. If the amount of Si is less than 0.05% by weight, such an effect is not sufficient. If it is more than 0.35% by weight, the machinability of the steel material becomes substantially decreased. Thus, the upper limit for the amount of Si to be contained is 0.35% by weight. The addition amount of manganese (Mn) should be 1.0% by weight or more to ensure the effect of induction hardening on the steel material. If 2.0% by weight or more of Mn is added in the steel material, then the machinability of the steel material becomes substantially decreased. Thus, the upper limit for the amount of Mn to be contained is 2.0% by weight. Aluminum (Al) is added as a deoxidizer of the steel material. It is preferable that the content of Al be minimized because of the cleanness of the steel material. Thus, the amount of Al may be 0.05% weight or less. Furthermore, sulfur (S) depresses the deformability of the steel material at the time of cold working. If the amount of S is more than 0.01% by weight, such a decrease in the deformability becomes excess. Thus, the amount of S may be 0.01% by weight or less.

For complementing the induction-hardening acceptability of the steel material, the steel material may include 0.1-0.35% by weight of chromium (Cr) and 0.0005-0.005% by weight of boron (B). Alternatively, at least one of Cr and B may be included. If the content of Cr is less than 0.1% by weight, the effect of complementing the induction-hardening acceptability of the steel material becomes decreased. On the other hand, more than 0.35% by weight of Cr leads to an increase in cost of the steel material. In addition, if the content of B is less than 0.0005% by weight, the effect of complementing the induction-hardening acceptability of the steel material becomes decreased. On the other hand, more than 0.005% by weight of B does not influence on the effects of the induction hardening on the steel material.

After the high-frequency induction hardening and tempering treatment, a shot peening treatment may be performed on the whole circumference of the power transmission shaft 1. A torsion fatigue strength of the shaft 1 can be further increased by increasing a residual compression stress on the surface of the power transmission shaft 1. Here, the term "shot peening treatment" means that the stress on the surface of a target metal is uniformed by throwing small steel particles with great force exerted by compressed air or centrifugal force onto the surface of the metal.

The inventors of the present invention conducted the evaluations of torsion fatigue strength with respect to eight power transmission shafts (sample Nos. 1 to 8), where each of the samples have its own contents of C, Si, Mn, S, Al, Cr, and B in its composition, and its own Rockwell hardness HRC at and around the electro-unite portion. The results of the evaluations are listed in the table shown in FIG. 4.

For any portion except the electro-unite portion, the hardening and tempering treatment was performed such that the surface hardness of the outer diameter portion would have a hardness distribution of 50 or more in Rockwell hardness HRC. The hardness of neighborhood of the electro-unite portion is a result of converting a Vickers hardness measured at a location of 2 mm from the inner diametrical side to a Rockwell hardness. In this experiment, in a state in which both ends of the power transmission shaft 1 was being supported, one end of the power transmission shaft 1 was fixed, while a load torque was applied on the other end. For interpretation of results, the lower limit of the strength of the solid shaft having the same axial part diameter was used as a standard on which a judgment could be based. The power transmission shaft that endured 400,000 times or more of the repeated torque application was accepted.

As shown in the results listed in the table of FIG. 4, each of the samples (sample Nos. 4 to 8) that came up to the standard with respect to torsion fatigue strength was a power transmission shaft 1 constructed of a steel material including 0.30-0.45% by weight of carbon (C), 0.05-0.35% by weight of silicon (Si), 1.0-2.0% by weight of manganese (Mn), 0.05% by weight or less of aluminum (Al), 0.01% by weight or less of sulfur (S), and the electro-unite portion and neighborhood thereof are hardened so as to have a Rockwell hardness HRC of 45 or more.

As a power transmission shaft 1, other kinds of tubes except the electric-resistance welded tube can be used, for example as follows.

The power transmission shaft 1 is typically formed by a plastic working, for example, a swaging in which the diameter of an element tube is reduced by stamping in the radial direction thereof at high speed, while rotating the tube around the axis, or the like. The power transmission shaft 1 formed by such a plastic working of the swaging or the like may have a plastic flow of the raw material into the inner diametrical side at the time of reducing the diameter of the element tube. Thus, there is a tendency in which the inner diametrical surface of the hollow shaft become wrinkled.

According to the present embodiment, therefore, the inner diametrical surface 1c of the power transmission shaft 1 is hardened by the high-frequency induction hardening and tempering treatment. In other words, the hardening treatment is performed on the inner diametrical surface 1c of the power transmission shaft 1 by placing a coil for high frequency induction heating on the outer diametrical side of the power transmission shaft 1. The hardening treatment can be performed from the outer diametrical surface id of the power transmission shaft 1 to the inner diametrical surface 1c by the high-frequency induction hardening and tempering treatment through the entire wall thickness (a hatching portion shown in FIG. 1 is a region subjected to the high-frequency induction hardening and tempering, indicating a bake-out state). Therefore, the hardness of the surface portion of the inner diametrical surface 1c of the power transmission shaft 1 is brought to a Rockwell hardness HRC of 35 or more. Here, the term "surface portion" means, for example, a portion corresponding to almost one fourth of the wall thickness of the power transmission shaft 1.

As described above, the inner diametrical surface 1c of the power transmission shaft 1 is hardened using the high-frequency induction hardening and tempering treatment and the hardness of the surface portion of the inner diametrical surface 1c is brought to a Rockwell hardness HRC of 35 or more. Therefore, at the time of manufacturing the power transmission shaft 1 by plastic working, the wrinkle caused on the inner diametrical surface 1c at the time of manufacturing the power transmission shaft by plastic working is hardly brought into the origin of breakage, causing an increase in the strength of the power transmission shaft itself in addition to ensure a stable torsion fatigue strength.

In this embodiment, by the way, a coil for high frequency induction heating is arranged on the outer diametrical side of the power transmission shaft 1 to allow the hardening treatment from the outer diametrical side of the power transmission shaft 1. According to the present invention, however, it is not limited to such an arrangement. The coil for high frequency induction heating may be arranged on the inner diametrical side of the power transmission shaft 1 to allow the hardening treatment from the inner diametrical side of the power transmission shaft 1.

In addition, if a predetermined residual compression stress is applied on the outer diametrical surface 1d of the power transmission shaft 1, it becomes possible to further increase the torsion fatigue strength of the power transmission shaft 1 by means of an increase in the residual compression stress. A residual compression stress may be applied by two-stage shot peening treatment and may be then reached to 750 MPa or more.

In the first stage of the shot peening treatment, a high residual compression stress is applied to exert an influence upon the surface of the metal, deeply. For this purpose, such a shot peening treatment should be performed under the conditions that each of particles to be shot has a hardness HV of 750 or more, and a particle size of 0.51-0.1 mm, and is shot at a speed of 60 m/second or more. If the particle size of the shot particle is more than 1 mm, the surface of the power transmission shaft 1 becomes rough and a fatigue strength thereof becomes decreased.

In the second stage of the shot peening treatment, on the other hand, shot particles smaller than those of the first stage are used to increase the residual compression stress and maximum surface hardness of the surface of the power transmission shaft 1 to improve the surface roughness. For this purpose, therefore, each of the particles has a hardness HV of 750 or more and a diameter of 0.1-0.5 mm, which is smaller than that of the first stage. Thus, the shot peening treatment using smaller particles allows a residual compression stress of 750 MPa or more on the surface of the power transmission shaft 1. The reason of defining such a stress to 750 MPa or more is that the residual compression stress of the power transmission shaft on which a residual compression stress is not applied by the shot peening treatment, or the like is 750 MPa or less. In other words, the application of 750 MPa or more residual compression stress allows a further increase in the torsion fatigue strength.

The present inventors evaluated a torsion fatigue strength of each of nine power transmission shafts (samples). The power transmission shafts have the same inner and outer diameters, and they were subjected to the high-frequency induction hardening and tempering treatment under different conditions so that each of them has a surface portion hardness (Rockwell hardness HRC) of the inner diametrical surface different from one another, while a Rockwell hardness HRC of the surface portion hardness of the outer diametrical surface was 50 or more. The results of the evaluations are listed in the table shown in FIG. 5.

The hardness of the surface portion of the inner diametrical surface 1c is a result of measuring the hardness of a portion at almost 0.5 mm from the inner diametrical surface by a Vickers hardness measuring device and converting the measured hardness into a Rockwell hardness. In this test, in a state in which both ends of the power transmission shaft 1 was being supported, one end of the power transmission shaft 1 was fixed, while a load torque (±1.0 kN·m and ±1.2 kN·m) was applied on the other end thereof. In the table, the breakage origin of "out" indicates the outer diametrical side origin, while "in" indicates the inner diametrical side origin. For interpretation of results, the lower limit of the strength of the solid shaft having the same axial part diameter was used as a standard on which a judgment could be based. When the load torque was ±1.0 kN·m, the power transmission shaft that endured 400,000 times or more of the repeated torque application was accepted. When the load torque was ±1.2 kN·m, the power transmission shaft that endured 100,000 times or more of the repeated torque application was accepted.

As is evident from the results shown in FIG. 5, in the case of the power transmission shaft 1 having the inner diametrical surface 1c with the surface portion hardness of 35 or more in Rockwell hardness HRC, a wrinkle generated on the inner diametrical surface 1c does not become an origin of breakage, so that such a shaft 1 is accepted with respect to the torsion fatigue strength.

Furthermore, the present inventors evaluated a torsion fatigue strength of each of the power transmission shafts 1 (samples) having the same inner and outer diameters. They were subjected to the high-frequency induction hardening and tempering treatments under the same conditions in the presence or absence of a shot peening treatment, respectively. The results of the test are listed in the table shown in FIG. 6. Regarding the residual compression stress of the outer diametrical surface of the power transmission shaft 1, any sample was extracted and was then subjected to the measurement for one with or without the shot peening treatment. In this test, in a state in which both ends of the power transmission shaft 1 was being supported, one end of the power transmission shaft 1 was fixed, while a load torque (0-1.3 kN·m) was applied on the other end thereof.

As is evident from the evaluation results shown in FIG. 6, the power transmission shaft 1 subjected to the shot peening treatment is advantageous in an increase in the torsion fatigue strength, compared with one without being subjected to the shot peening treatment. In addition, the power transmission shaft 1 without being subjected to the shot peening treatment has the surface with a residual compression stress of 750 MPa at maximum. Therefore, it is preferable to provide the surface of the power transmission shaft 1 with a residual compression stress of 750 MPa or more by subjecting to the shot peening treatment.

What is claimed is:

1. A power transmission shaft having an electric-resistance welded pipe part made of a steel material and coupling members respectively provided on the opposite ends of the pipe part, wherein the steel material includes 0.30-0.45% by weight of C, 0.05-0.35% by weight of Si, 1.0-2.0% by weight of Mn, 0.05% by weight or less of Al, 0.01% by weight or less of S, and the remainder, iron Fe and unavoidable impurities, and the pipe part has an electro-unite portion that extends in an axial direction, the electro-unite portion and neighborhood thereof being hardened by a hardening treatment so as to have a Rockwell hardness HRC of 45 or more wherein the steel material contains S; and wherein the hardening treatment is a high-frequency induction hardening and tempering treatment.

* * * * *